May 19, 1942.　　　A. U. WELCH, JR　　　2,283,711
ELECTRICAL WINDING
Filed April 26, 1940
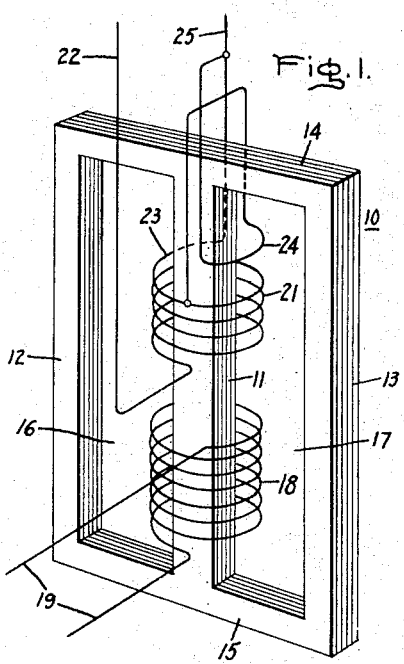
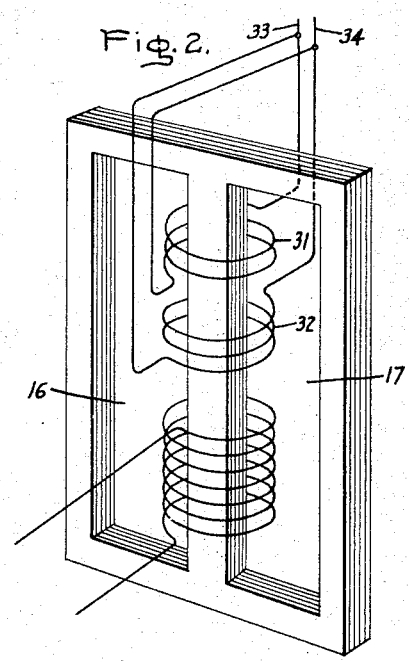
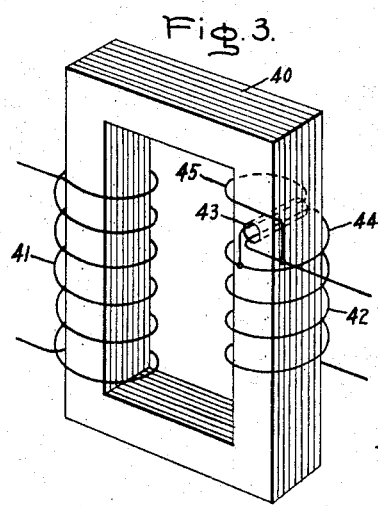
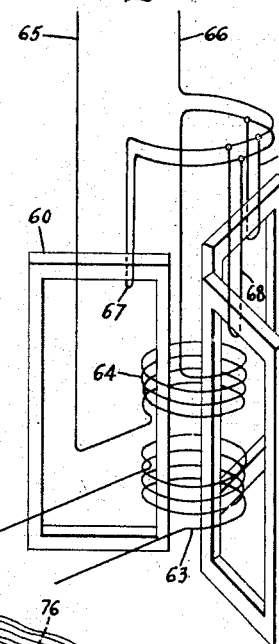
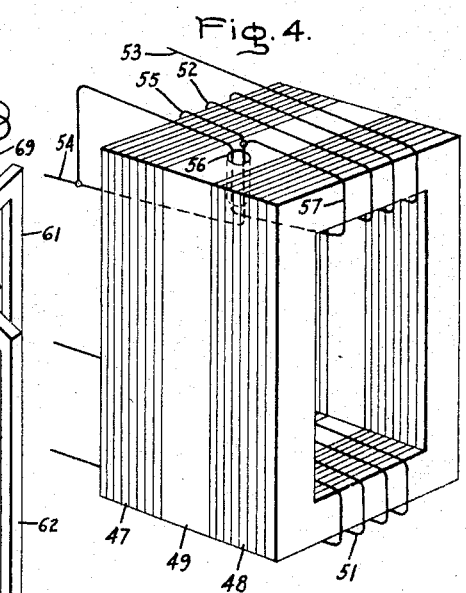
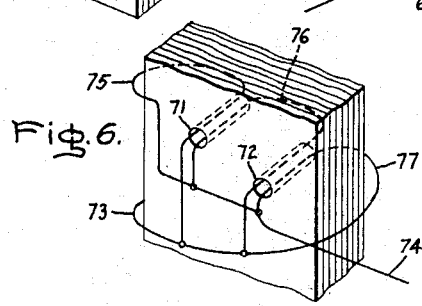
Inventor:
Alanson U. Welch, Jr.
by Harry E. Dunham
His Attorney.

Patented May 19, 1942

2,283,711

UNITED STATES PATENT OFFICE 2,283,711

ELECTRICAL WINDING

Alanson U. Welch, Jr., Pittsfield, Mass., assignor to General Electric Company, a corporation of New York Application April 26, 1940, Serial No. 331,768

6 Claims. (Cl. 175—358)

The present invention relates to electrical windings and more particularly to winding arrangements of transformers for obtaining fractional turn ratios of transformation.

In transformer design it is sometimes desirable to provide a winding with an effective fractional turn because a single complete turn represents too great a proportion of the total winding. This is particularly true in the case of certain types of furnace transformers which may have a secondary winding consisting of only four or five turns. If, for example, the secondary potential is to be 100 volts, then in case of a four turn winding, each turn represents 25 volts. To vary the voltage by an amount less than what would be effected by a complete turn, an effective fractional or partial turn is provided. Instrument transformer windings are also frequently provided with an effective partial turn for compensation of the excitation current to correct the transformation ratio. A common form of a partial turn winding has an end turn thereof encircling a predetermined portion of the total cross-section of the magnetic core. During no load condition the primary flux will distribute through the parallel flux paths of the core in substantially direct proportion to the relative cross-sectional areas of the parallel paths. With a secondary current flowing, however, the distribution of the core flux in the various paths will be unbalanced and the effectiveness of the partial turn will vary with fluctuations in the secondary current. Depending upon the specific type of core construction used and the configuration of the flux paths this unbalanced flux distribution in the core may result in certain parts of the core becoming saturated producing an excessive reactance voltage drop. It is important, therefore, for stable operation of the transformer that the effective partial turn of the winding produces no unbalanced condition of the flux distribution in the parallel magnetic circuits of the core structure.

It is an object of the present invention to provide a transformer having a new and improved winding arrangement for obtaining a fractional turn ratio of transformation.

It is a further object of the invention to provide a new and improved transformer having an effective partial turn winding which will maintain a uniform and balanced distribution of the core flux throughout the magnetic structure.

The invention may be best understood by reference to the following description and the accompanying drawing in which Fig. 1 is a perspective view of the transformer having a shell-type core and provided with a winding as constructed in accordance with one modification of the invention; Fig. 2 is a perspective view of the transformer also having a shell-type core and provided with a winding constructed in accordance with a second modification of the invention; Figs. 3 and 4 are perspective views of transformers having core type magnetic structures and provided with windings in accordance with other modifications of the invention; and Figs. 5 and 6 are views illustrating still further modifications of the invention.

The transformer shown in Fig. 1 includes a shell-type laminated magnetic core 10 having a central winding leg 11 and other legs 12 and 13, the legs being connected together by yokes 14 and 15 defining windows 16 and 17. Surrounding the winding leg 11 is a primary coil 18 having terminal leads 19. Also surrounding the winding leg 11 is a secondary coil 21 one end of which is connected to a terminal lead 22, the other end being connected through parallel conductors 23 and 24 to a terminal lead 25. The coil 21 comprises an integral number of turns, that is, the same number of conductors extend through the core window 16 as through the window 17. The branch conductors 23 and 24 extend through different windows, or the core windows 16 and 17, respectively, in the same direction as regards current flow, as the turns of the winding portion 21. Thus, one branch or parallel conductor is electromagnetically coupled with or surrounds one parallel flux path while the other parallel conductor surrounds another parallel flux path. Since one-half of the secondary current will flow through the conductor 23 linking the magnetic circuit surrounding window 16 and the other half of the secondary current will flow through conductor 24 linking the magnetic circuit surrounding window 17, an effective half-turn is produced. Since the same number of ampere turns extend through the two core windows, it is obvious that the core flux in the two parallel paths of the magnetic circuit will be maintained uniformly balanced for all values of secondary current.

In Fig. 2 is illustrated a second modification of the invention, also applied to a shell-type core, in which the secondary winding comprises two coils 31 and 32 having an equal number of turns and connected in parallel between the terminal leads 33 and 34. The turns of the two coils encircle the winding leg in the same direction as regards current flow therethrough. The coils each include an effective fractional turn, that is, the coil 32 includes one more conductor extending through the core window 17 than extends through the core window 16, while the coil 31 includes one more conductor extending through core window 16 than extends through the window 17. The current will divide equally between the two coils and the resultant effect will be that of a winding having one-half the combined number of turns of the two coils, or two and one-half turns for the illustrated embodiment. Since the total number of conductors extending through the two core windows are the same, the number of ampere turns linking the two parallel magnetic circuits will be equal and the flux distribution through the parallel flux paths will therefore be maintained uniformly balanced for all values of secondary current.

While the invention has been described above as applied to shell-type magnetic structures, it may also be applied to core-type structures. In the modification illustrated in Fig. 3 the transformer magnetic structure comprises a rectangular core 40 of laminations and having a primary winding 41 provided upon one leg thereof, and a secondary winding 42 provided upon a second leg. An opening 43 is provided transversely through the laminations of the core adjacent one end of the secondary winding so as to form two parallel magnetic flux paths therein of substantially equal cross-section areas. The end turn 44 of the winding 42 extending around the outside of the winding leg is brought through the opening 43 and thus links but one-half of the magnetic core structure. Connected in parallel with the end turn 44 is a loop 45 which extends through the opening 43 and is returned through the core window. The loops 44 and 45 extend around the corresponding core portions in the same direction as regards the current flow therethrough, as the other turns of the secondary winding and the current will divide equally between them so that the resultant effect is that of a complete turn encircling the entire core but carrying only one-half of the secondary current, or, a one half turn. Since the same number of ampere turns links the two parallel flux paths of the magnetic circuit, no unbalance condition of flux distribution is created by the partial turn arrangement.

In Fig. 4 is illustrated a modification of the invention similar to that of Fig. 3 except that in this instance the core laminations are divided into two groups 47 and 48 with a spacer 49 of non-magnetic insulating material arranged therebetween. A primary winding 51 is arranged upon one leg of the core structure while a secondary winding 52 having terminal leads 53 and 54 is provided upon a second leg the end turn 55 of which secondary winding is passed through an opening 56 in the spacer and brought out through the window linking only the core portion 47. Connected to the end turn 55 on the outside of the core is a loop 57 which extends only through the window of the core portion 48, up through the opening 56 and is connected to the terminal lead 54. Different of the parallel conductors or loops 54. link with each of the parallel flux paths in the same direction as the secondary winding turns as regards current flow. Since the loop 57 is connected in parallel with the loop 55, the current will divide equally between them so that the resultant effect will be that of a half turn as in the previously described modifications. Thus it will be apparent that the magnetic structure of a transformer may be divided in any suitable manner so as to provide two parallel paths for the core flux and that the end turn of the secondary winding may be connected in series to two parallel loops each loop surrounding one of the magnetic paths to provide an additional one half turn without causing any unbalance in the flux distribution in the two flux paths.

To secure a fractional turn less than one half turn it is merely necessary to divide the magnetic structure of the transformer into a greater number of parallel core flux paths and to link each path with a parallel loop connected in series with the secondary winding. In Figs. 5 and 6 are shown arrangements by which an effective one third turn may be obtained. The transformer in Fig. 5 includes a shell type magnetic structure which is divided into three parts 60, 61 and 62. A primary winding 63 is provided around the grouped winding legs of the core parts so that the turns thereof link with each of the three or all the parallel magnetic circuits. The secondary winding 64 comprises an integral number of turns surrounding the winding legs of the three core parts, one end thereof being connected to the terminal lead 65. The other end of the winding portion 64 is connected to the terminal lead 66 through three parallel loops 67, 68 and 69. As in the previously described modification of the parallel loops each extend through the window of a corresponding core portion in the same direction as the turns of the winding portion 64. The total secondary current will divide equally among the three parallel loop circuits so that the resultant effect of the arrangement will be that of the single turn linking all three of the magnetic circuits but carrying only one third of the secondary current.

To provide an effective one third turn on a transformer having a core type magnetic structure the secondary winding leg may be divided into three parallel flux paths by providing two openings 71 and 72 through the laminations as indicated in Fig. 6. Connected in series between the end turn 73 of the secondary winding and the terminal lead 74 are three parallel connected loops 75, 76 and 77 so threaded through the openings that each loop surrounds a different core portion, and, of course, in the same direction, as regards current flow therethrough, as the turn 73. As in the previously described modification, the total secondary current will divide equally between the three parallel loops circuits and the resultant effect will be that of a single loop carrying one third of the total secondary current except that a uniform distribution of the core flux will be maintained in the three parallel magnetic paths.

It will be appreciated that fractional turns of smaller effective values may be provided on a transformer core by simply dividing the magnetic structure into a corresponding number of parallel paths and looping each with a parallel loop connected in series between the main portion of the secondary winding which may include a plurality of series turns linking all the plurality of flux paths, and a terminal therefor. Furthermore, by providing combinations of two or more of the above described modifications it will be obvious that a fractional turn of any desired effective value may be obtained on a transformer.

Having described the principle of operation of my invention together with the modifications which are now considered the best embodiments thereof, I desire to have it understood that the specific arrangements shown are merely illustrative and that the invention may be carried out by other means.

What I claim as new and desire to secure by Letters Patent of the United States is:

1. A transformer having a magnetic core providing a plurality of parallel flux paths, a winding on said core having a plurality of series turns linking all of said flux paths and means connected between said turns and a terminal for said winding providing an additional effective fractional turn of said winding and so arranged as to maintain a substantially uniform distribution of flux in said parallel flux paths.

2. A transformer having a core providing a plurality of parallel flux paths, a primary winding having a plurality of turns linking all of said flux paths, a secondary winding having a plurality of series turns linking all of said plurality of flux paths, an end of said secondary winding being provided with a plurality of parallel connected conductors, an equal number of different of said parallel conductors linking with each of said parallel flux paths and in the same direction as the secondary winding turns as regards current flow therethrough.

3. A transformer having a magnetic core providing a plurality of parallel flux paths, a winding having a plurality of series turns linking all of said plurality of paths and a plurality of parallel connected turns connected in series with said first plurality of turns, each of said parallel turns linking only one of said parallel flux paths.

4. A transformer having a shell type magnetic core structure including a central winding leg and defining a pair of windows, a winding portion on said leg having an integral number of turns, a pair of parallel connected conductors connected between an end of said winding portion and a terminal therefor, each of said conductors extending through different of said pair of windows and in the same direction as regards current flow as said integral number of turns.

5. A transformer having a magnetic core including a winding leg, a winding comprising an integral number of turns surrounding said winding leg, an opening through said winding leg dividing said core into a pair of parallel flux paths of substantially uniform cross sectional area, a pair of parallel conductor loops connected between an end of said winding and a line terminal therefor, each of said loops having one side extending through said opening and surrounding different of said parallel paths in the same direction as said turns.

6. A transformer having a magnetic core structure including a winding leg, a winding having a plurality of series turns extending around said leg, means dividing said leg into a plurality of parallel flux paths, a plurality of condutcors connected in parallel between an end of said winding and a terminal therefor, each of said parallel conductors surrounding different of said parallel flux paths of said divided core in the same direction as regards the current flow therethrough as the turns of said winding.

ALANSON U. WELCH, Jr.